Nov. 3, 1970  T. THOMAS ET AL  3,538,313
CODED STRIP POSITIONING APPARATUS
Filed May 15, 1968  6 Sheets-Sheet 1
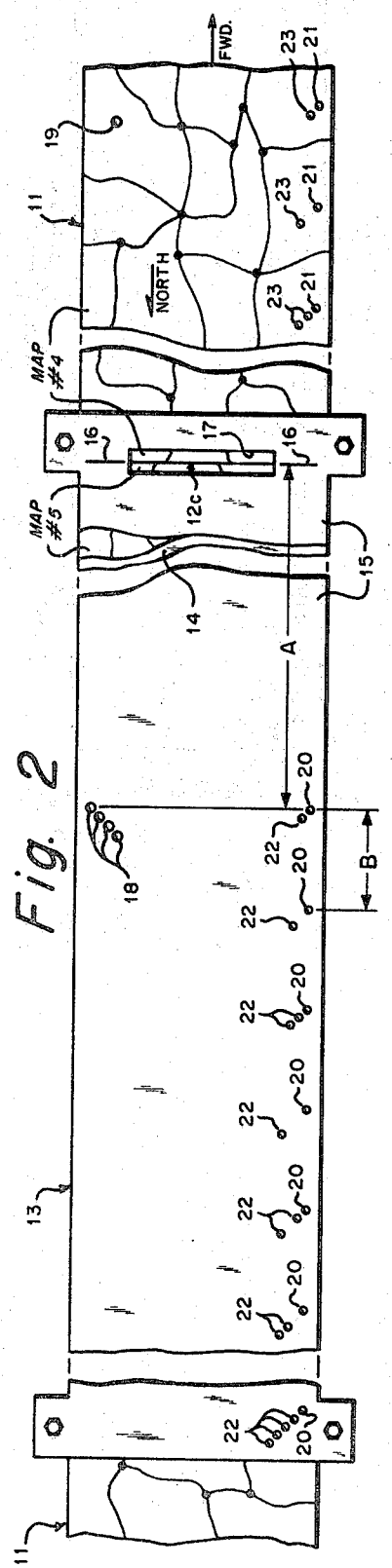
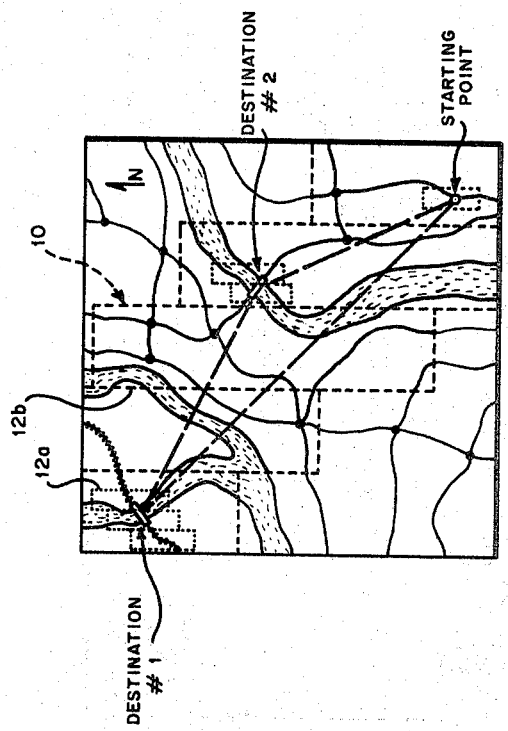
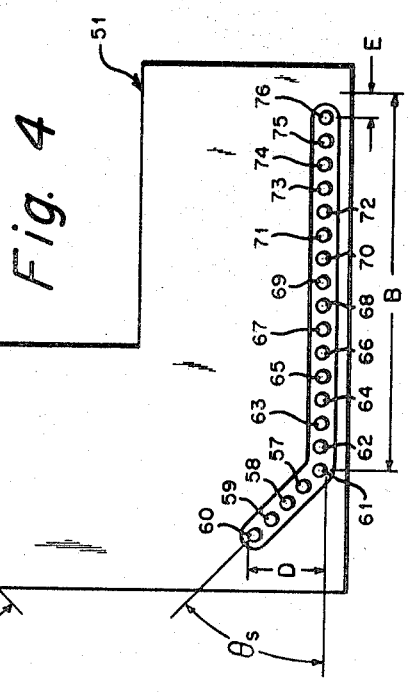
INVENTORS
TERRY THOMAS
ERIC A. ALFONSI
FRANK J. ALESSANDRO
GUNTHER G. GAEBLER
JOHN M. K. BERGEY
BY
ATTORNEYS

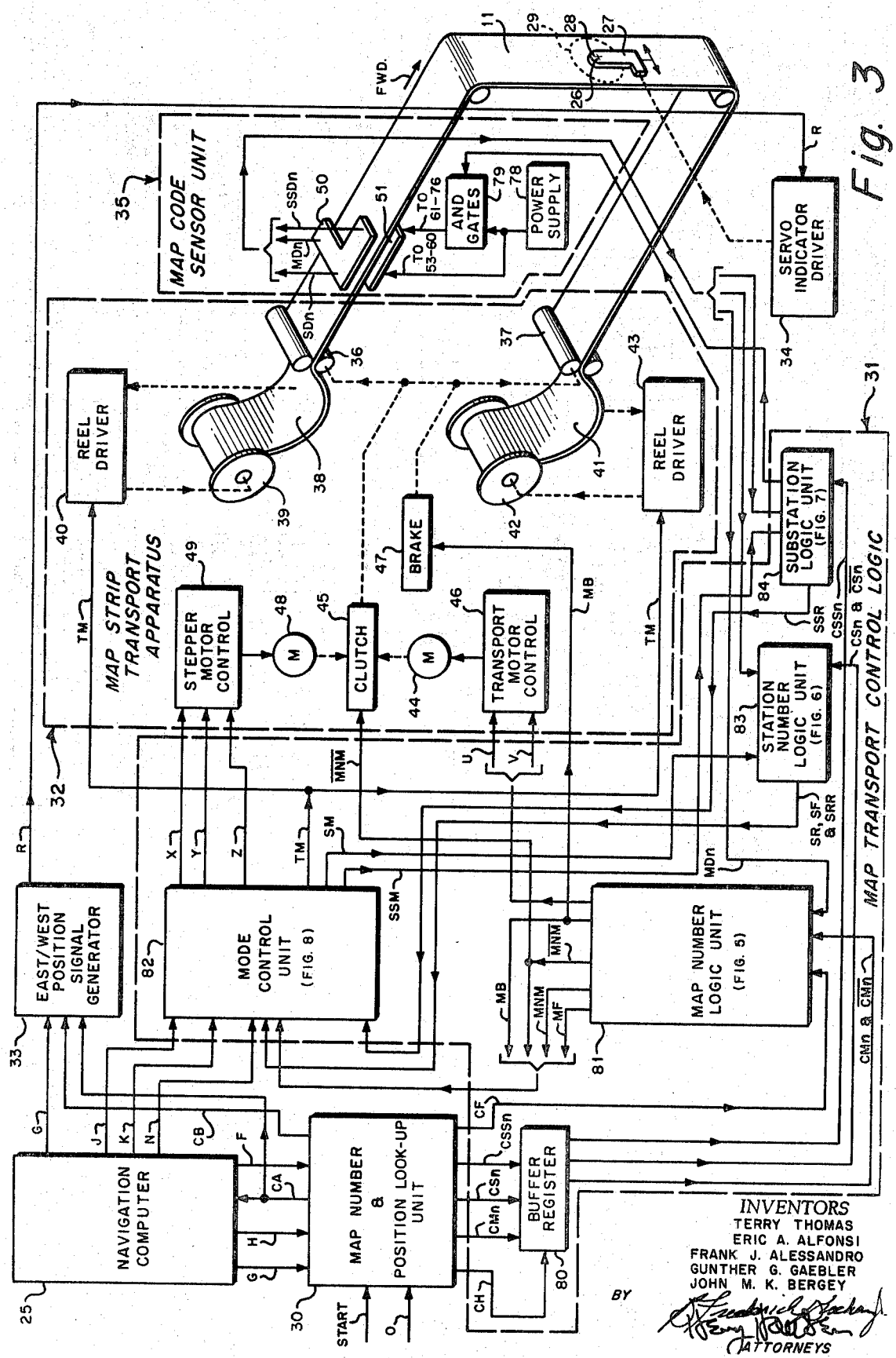

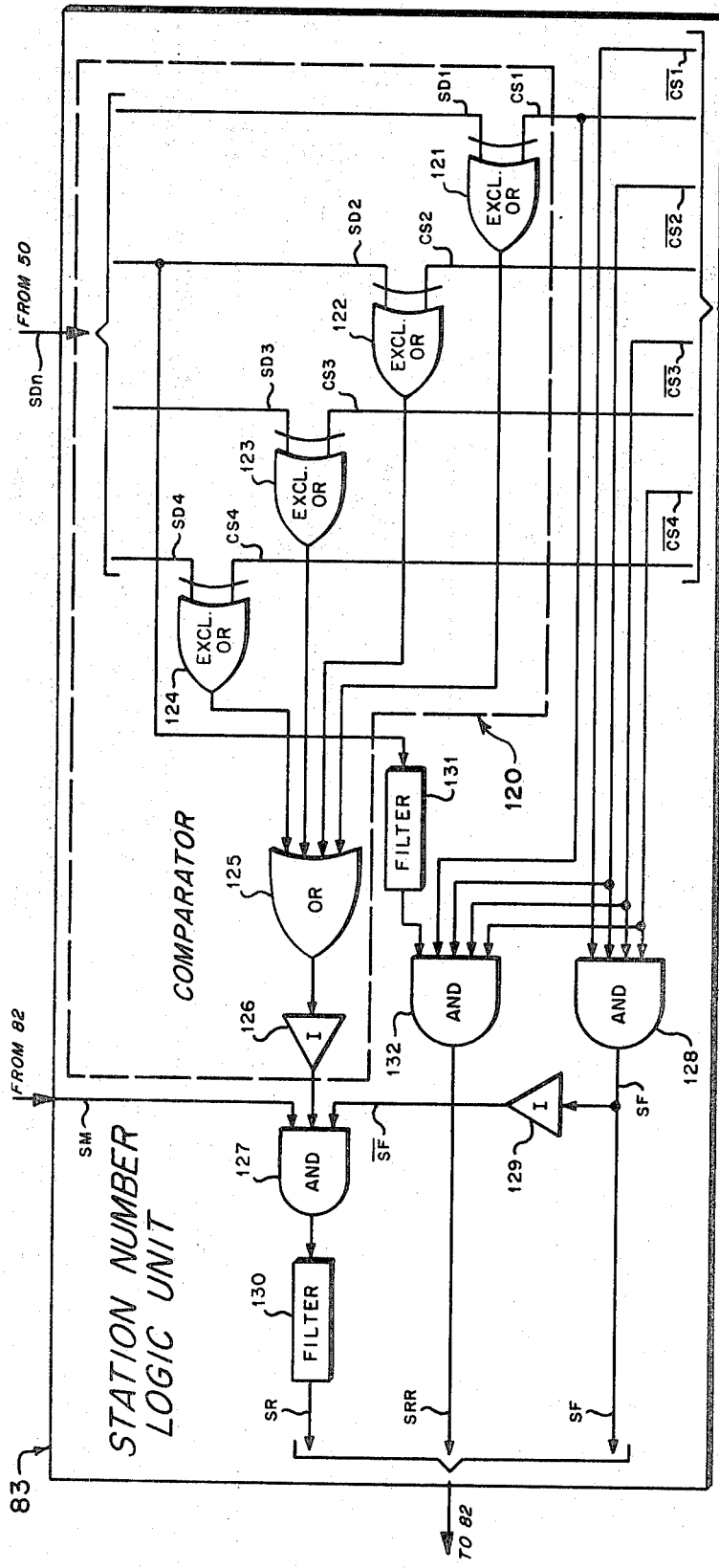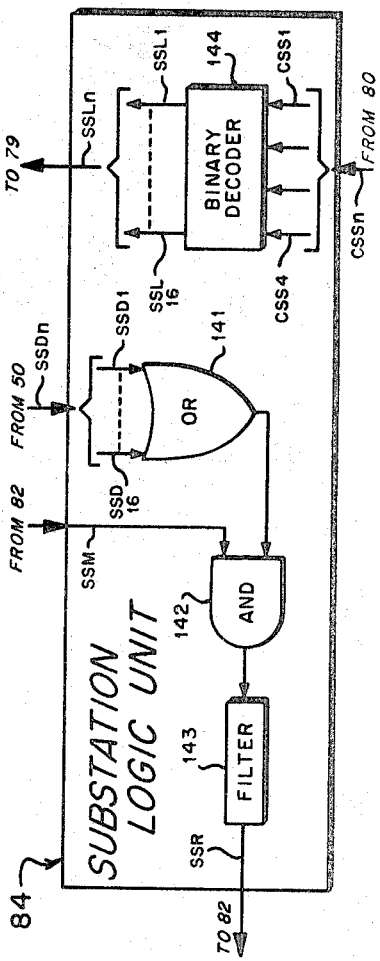

United States Patent Office 3,538,313
Patented Nov. 3, 1970

3,538,313
CODED STRIP POSITIONING APPARATUS
Terry Thomas, Abington, Eric A. Alfonsi, Wyncote, Frank J. Alessandro, Upper Darby, Gunther G. Gaebler, Andalusia, and John M. K. Bergey, Doylestown, Pa., assignors to the United States of America as represented by the Secretary of the Navy
Filed May 15, 1968, Ser. No. 729,283
Int. Cl. G06f 15/48; G09b 29/10
U.S. Cl. 235—150.27                                                                                 26 Claims

ABSTRACT OF THE DISCLOSURE

Computer controlled apparatus for registering in accordance with the instant geographical latitude and longitude of an aircraft position a predetermined portion along its length of a strip of coded, end-to-end linked maps drawn to variable scales with a transversely movable ground track indicator and thereafter for moving the strip and the indicator in accordance with the changes respectively in latitude and longitude of the aircraft position. The apparatus includes a data look-up unit responsive to longitude and latitude signals from a navigation computer for providing signals representing a predetermined map and a predetermined transverse segment located along the length of that map. Logic circuitry responds to the look-up unit signals for causing, at first, a transport motor to drive the strip until the selected map number is photoelectrically detected and, thereafter, a stepper motor to drive the strip at a lower rate of speed for detection of station and substation areas. The stepper motor is then caused to drive the strip in accordance with the rate of change in latitude of the aircraft position, and the indicator is moved transversely of the strip in accordance with changes in longitude for indicating the ground track of the aircraft.

---

The invention described herein may be manufactured and used by or for the Government of the United States without the payment of any royalties thereon or therefor.

BACKGROUND OF THE INVENTION

This invention generally relates to apparatus for positioning a predetermined portion along its length of a coded strip at a predetermined point and, more particularly, to navigational display apparatus for precisely positioning a plurality of coded maps forming a map strip.

Navigational displays are known which generally function to register an indicator with a map displaying the area over which an aircraft is flying for indicating the ground track of the aircraft. When the indicator is driven across an edge of the map, problems arise in smoothly and quickly positioning another map having an adjacent field of view. Some displays have attempted to overcome this difficulty by requiring that a map strip be provided wherein the contemplated ground track of the aircraft runs along its center line. Since the degree of deviation from the contemplated ground track is thereby severely limited the utility of the display as a means for quickly ascertaining aircraft position in unfamiliar areas is impaired. Additionally, such displays are difficult if not impossible to use when the contemplated ground track is not a straight line but rather is a tortuous path as when an aircraft is to fly in one direction to a first destination, in another direction to a second destination and in a different direction to the starting point.

SUMMARY OF THE INVENTION

Briefly, it is the general purpose of this invention to provide an improved navigational display which can quickly and smoothly position an indicator relative to a selected one of several maps whose fields of view in composite disclose the area over which the aircraft is to be flown, taking into account possible course deviations. Briefly, this is accomplished by providing novel apparatus for registering a predetermined portion of an elongated coded strip with an indicator and including means for sensing coding arranged along the longitudinal margins of the strip. The invention further contemplates providing a navigational computer responsive look-up unit for selecting a specific portion of a selected map having one of several possible scales in accordance with the instant longitude and latitude of an aircraft position and providing novel logic means responsive to the unit for controlling a transport motor connected for driving a map strip formed from a plurality of end-to-end linked maps until the selected may is sensed and thereafter for driving the map strip at a lower speed with a stepper motor to exactly position a portion of the map in accordance with the latitude of the aircraft position, which logic means thereafter enables the strip to be moved in accordance with the change in latitude of the aircraft.

BRIEF DESCRIPTION OF THE DRAWING

FIG. 1 represents a composite of similarly scaled fields of view of a plurality of local and navigational maps forming a display apparatus map strip;

FIG. 2 represents a plan view of a jig as used for coding an assembled map strip;

FIG. 3 represents a block diagram of a navigational display according to the invention;

FIG. 4 represents an enlarged view of the map confronting side of a light source array of the apparatus of FIG. 3;

FIG. 6 represents a block diagram of a station number logic unit of the apparatus of FIG. 3;

FIG. 7 represents a block diagram of a substation logic unit of the apparatus of FIG. 3;

DESCRIPTION OF THE PREFERRED EMBODIMENT

Map strip configuration

Figure 5:
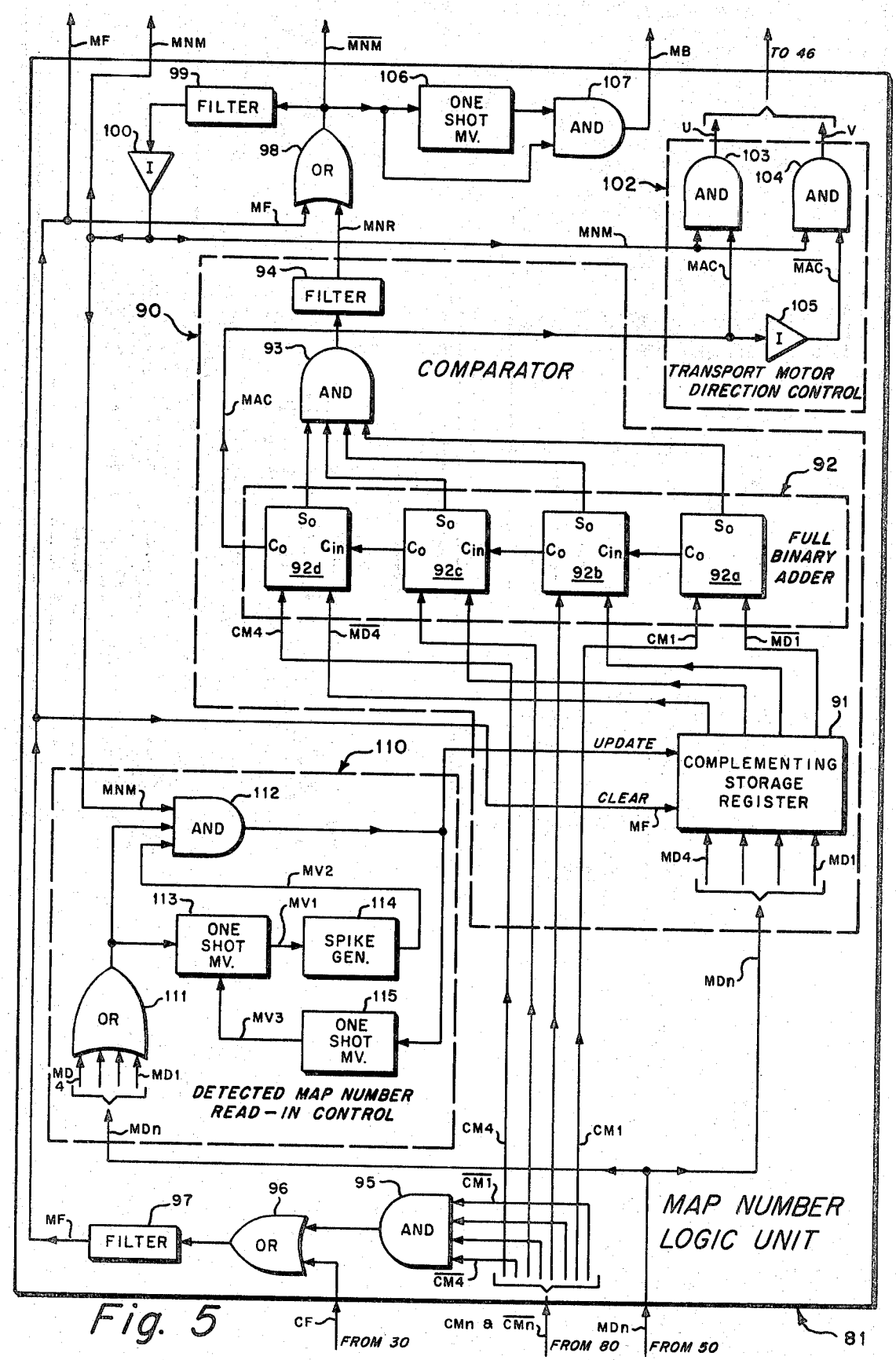
FIG. 5 represents a block diagram of a map number logic unit of the apparatus of FIG. 3.

Referring to FIG. 1, let it be supposed that a pilot wishes to fly from north-west a starting point to a destination #1, from thence generally east, south-east to destination #2, and thereafter south, south-east to the starting point. A composite 10 including the contemplated ground track and the adjacent geographical area over which is forseeable that the aircraft could deviate may be visualized as comprising a plurality of north-south oriented rectangular sections or fields of view which can be centered for display on respective maps having identical physical widths in the east-west direction. Once the desired rectangular sections or fields of view have been selected and once maps of the appropriate size have been obtained which display the desired fields of view, the maps are assigned numbers and are linked end-to-end in order to form a map strip 11 shown in FIG. 2 which has leader sections (not shown) at its ends. All of the fields of view of the maps have the same relative geographical orientation relative to the longitudinal extent of the strip 11, i.e., the southern edges of succeeding maps are linked to the northern edges of preceding maps. It is preferred that the northern and southern boundaries of each of the desired fields of view be so selected that the contemplated ground track does not extend through them.

The pilot may desire larger scaled maps of certain geographical areas, represented by the smaller rectangles 12a in FIG. 1, such as at the starting point, at the destinations and in areas where greater map detail is needed to correlate actual aircraft position with displayed ground track. Even though the relatively smaller fields of view 12a to be displayed on local maps of a larger scale may lie within one or more of the larger fields of view 12b to be displayed on navigational maps, the fields of view 12a of the local maps should have the same physical widths as do the fields of view 12b of the navigational maps so that more simple apparatus may be used for moving the ground track indicator in accordance with changes in geographical longitude. The field view of each of the maps may be particularly described by known geographical longitudes and latitudes generally lying along the boundaries thereof.

It is preferred that each of the maps have a physical width which is greater than the programmed field of view displayed thereby so that a ground track indicator which is to be registered with the map strip 11 need never be registered with the edges of the maps. It is also preferred that the maps of the strip 11 generally be arranged in a sequence determined by the contemplated ground track of the plan.

The map strip 11 must be coded, as by a series of punched holes, so that the displaying apparatus may sense, as by photoelectric means, which specific portion of the strip is being displayed and reposition the strip, if necessary, to display a desired portion thereof. A jig 13 such as is shown in FIG. 2 may be used to properly position the necessary holes at prescribed locations along the map strip margins. The jig 13 comprises a pair of juxtaposed metal or plastic plates 14 and 15 adapted for receiving therebetween the map strip 11. The plates 14 and 15 have map coding holes bored through the upper 15 into the lower 14 in registration with the map strip 11 whose edges are aligned with the plates 14 and 15. One end of the jig 13 has a reference line 16 scored perpendicularly across the width thereof and across an intervening elongated rectangular view aperture 17 formed in the plate 15, if a non-transparent material is used, enabling the registration of the leading or southern edge 12c of each of the maps, in turn, with the line 16 prior to clamping each map in coding position between the plates 14 and 15.

Each map in the strip 11 may be visualized as being divided into a number of contiguous, transversely extending, station areas of equal widths, in turn, subdivided into a number of contiguous substations of equal width which also extend transversely across the strip 11. The width of a substation depends upon the desired degree of resolution for the apparatus as limited by the minimum required separation distances between successive light sensors arranged in a linear array or between successive ones of their associated light sources. For example, the width of each substation may be about 0.145 inch representing a difference in latitude of about one-half a minute on a navigational map drawn to a scale of 250,000:1. The number of substations in a given station area is selected to be large enough so that the number of holes to be punched in the map strip 11 for identifying successive stations is minimized and yet small enough to reduce the size and complexity of the arrays for sensing the map code and the logic for processing the resulting signals. A desirable number of substations to be included in a station area is sixteen since only four binary bits of information are needed to represent any particular substation. Consequently, continuing the above example, the widths of the station areas are each about 2.325 inch representing about eight minutes width in latitude on the navigational maps and about two minutes on the local maps. The north-south lengths of each of the maps are desirably chosen so that the maximum required number of stations does not exceed about fifteen in order to keep the size of the required processing logic within desired limits. Each substation on the strip 11 can be definitely described by a map number, a station number, and a substation number.

By using holes punched in the strip to represent ONE's in the binary numbers corresponding to the map number and the station number, each map number and station number may be photo-electrically detected even though the strip 11 is being moved. Accordingly, a linear array of map number coding holes 18 for use in punching map number holes 19 in the strip 11 are formed in the plates 14 and 15 of the jig 13 in registration with the map strip 11 adjacent one edge thereof. The size of the map holes 19 depends upon the cone of sensitivity of the associated photodetectors, the permissible degree of map alignment deviation, and the desired signal duration relative to the speed of the strip 11 when searching for a specific map number. The map number coding hole 18 closest to the reference line 16 is physically spaced therefrom a distance A corresponding to the distance measured along the strip 11 between a light sensor arranged to detect the registration of that map hole therewith and a horizontal reference line carried by a ground track indicator included in the display apparatus. Four map number coding holes 18 are sufficient to enable the coding of up to fifteen maps since at least one of the bits of information in a map number must be a ONE. The coded arrangement of map number holes 19 extends at an angle $\theta_m$ relative to the margin of the map strip 11. The holes 19 may be considered as being arranged on respective tracks extending longitudinally of the strip 11 and spaced apart a sufficient distance to avoid cross talk between light sensors which are each arranged to sense the presence of respective associated ones of four possible map number holes 19. When coding the maps, the four holes are used as guides to punch each succeeding map in the appropriate place with the ONE's of the corresponding binary map number.

Since the southern edge of 12c of each map is arbitrarily assigned the station number one and the substation number one, a smaller sized substation coding hole 20 for use in punching a substation hole 21 in the strip 11 is arranged adjacent the opposite margin of the map strip 11 on a perpendicular line extending through the first map coding hole 18. The necessary substation coding holes 20 for an entire map are linearly arranged inwardly of and parallel to the margin of the underlying map strip 11 and are spaced apart a distance B corresponding to the width of each station area. Only one substation coding hole 20 is needed for a given station area because the display apparatus functions to move the map strip 11 until the substation hole 21 for the proper station is positioned in registration with that one of a linear array of substation light sources which is then being activated. Each succeeding substation coding hole 20 is positioned adjacent an obliquely extending linear arrangement of one or more station number coding holes 22 which are of the same size as the substation coding holes 20 and are arranged, in turn, for use in punching station number holes 23 representing the ONE's of the successively increasing binary station numbers. It is preferred that the map number and station number hole arrangements be inclined relative to the may strip margin at angles such as $\theta_m$ and $\theta_s$ so that the widths C and D of the perforated marginal areas of the map strip 11 are minimized to avoid placement of holes in the programmed field of view of each of the maps. It is preferred that the map number holes 19 be larger than the station and substation holes 21 and 23 since the strip 11 is moved at a much greater speed when the map number is to be detected. Tearing of the perforated margins of the strip 11 during use can be avoided by applying transparent flexible plastic tape to lap and reinforce the edges of the strip 11.

GENERAL CONFIGURATION OF DISPLAY APPARATUS

Referring now to FIG. 3, the navigational display apparatus generally responds to signals provided by a conventional navigation computer 25 and representing the instant geographical longitude and latitude of an aircraft position for registering a specific substation of a specific map with a horizontal reference line 26 of a ground track indicator 27. The indicator 27 is transversely movable by the display apparatus to register its vertical reference line 28 with the corresponding longitude displayed on the map. The horizontal reference line 26 of the indicator 27 remains in registration with the diameter of a circular display area 29 during movement of the indicator 27.

The conventional computer 25 provides a pair of signals G and H representing the geographical longitude and latitude of the aircraft position to a map number and position look-up unit 30. The computer 25 also provides a failure signal, F, to the unit 30 in the event that it is unable to provide correct or stable signals G and H. The computer 25 also provides a pair of complementary digital signals J and K indicative of the direction and an analog signal N indicative of the magnitude of the north-south component of aircraft ground speed.

The primary function of the unit 30 is to provide a four-bit binary signal $CM_n$ indicative of the number of the map whose field view includes the particular longitude and latitude being indicated to the unit 30 by the computer 25, a four-bit binary signal $CS_n$ indicative of the station number and a four-bit binary signal $CSS_n$ indicative of the particular substation which together indicate the particular latitudinal segment of the map strip 11 which is to be registered with the indicator 27. The unit 30 may, for example, be an additional memory bank and associated readout logic of a general purpose digital computer carried by the aircraft and can include, if necessary, means for converting longitude and latitude signals G and H into digital form, if they are supplied by the computer 25 in analog form. In the events that the signal F is a ONE or that there is no map in the strip 11 which displays the particular longitude and latitude being ordered by the computer 25, the unit 30 provides a unit failure signal, CF. The unit 30 has stored therein the geographical latitudes and longitudes lying along or defining the boundaries of the fields of view of each of the maps in the strip 11 and is programmed in a manner well known in the art to provide the appropriate map number, station number and substation signals corresponding to that required by signals G and H. The unit 30 is further programmed to provide the map number, station number and substation signals of that map which is drawn to the largest scale, i.e., the local map, when more than one map displays in its programmed field of view the particular geographical longitude and latitude being called for by the signals G and H from the computer 25. Additionally, means are provided to respond to navigation override signal, O, applied at the option of an operator for reading out instead the appropriate map, station and substation numbers for the smaller scaled navigation map which displays the position called for by the computer 25. The unit 30, in turn, provides the computer 25 with a signal, CA, indicative of the scale, i.e., local or navigational, of the particular map selected by the unit 30 in response to the signals G and H so that the analog north-south component ground speed signal N may be accordingly scaled by the computer 25.

In general, the parallel binary signals $CM_n$, $CS_n$, $CSS_n$ and CF are fed from the unit 30 to a map transport control logic unit 31 which, in turn, provides appropriate motor direction and speed control signals to cause a map transport apparatus 32 to position the appropriate substation area of the appropriate map of the map strip 11 in registration with the indicator 27. The navigational computer 25 provides the map transport control logic unit 31 with the complementary direction signals J and K, i.e., north or south, and the analog north-south speed signal N to enable the logic unit 31 to cause the transport apparatus 32 to drive the strip 11 in accordance with latitudinal changes in aircraft ground track position once the strip 11 has been initially positioned.

Additionally, the computer 25 provides the analog signal G indicative of the aircraft position longitude to an east-west position signal generator 33. The generator 33 is also connected to receive the map scale signal CA, which is also indicative of map field of view width measured in minutes, and a signal CB indicative of the longitude of the eastern field of view boundary of the particular map selected by the unit 30 in response to the computer 25. The generator 33 functions to provide an analog signal R which is scaled in response to the computer directed longitude and to both the width of, in term of minutes, and the longitude of the eastern boundary of the programmed field of view of the particular map selected by the unit 30. The analog signal R is applied to a servo indicator driver 34 to cause it to accordingly position the vertical reference line 28 of the indicator 27 in registration with the computer directed longitude appearing on the field of view of the unit selected map being displayed. For example, let it be supposed that one of the maps on the strip 11 has a programmed field of view which is twenty-one minutes wide in longitude and which has an eastern field of view boundary of 74°50′ W. Let it further be supposed that the signal C from the computer 25 represents a longitude 75°4′ W. The indicator line 28 will, therefore, be moved two-thirds of the physical distance across the programmed field of view from the eastern boundary thereof. For the same signal G if the map number $CM_n$ represents a local map having a field of view width of 5.25 minutes and an eastern field of view boundary of 75°2′ W., the indicator would be positioned $8/21$ of the field of view width from the eastern field of view boundary. Where the eastern boundaries of the map fields of view, although different in longitude, are coextensive from map to map, the generator 33 is easily mechanized in a conventional manner well known in the art, in effect, to subtract the longitude represented by CB from the longitude represented by G and provide the analog signal R representing the ratio of the above-derived difference to the field of view width indicated by CA and measured in terms of longitude, e.g., 21 minutes for navigational maps or 4.25 minutes for local maps.

MAP TRANSPORT APPARATUS

In general, the map transport apparatus 32 of FIG. 3 is utilized to drive the coded map strip 11 through a map code sensor unit 35 and past the display area 29 at a relatively high rate of speed, such as 12 inches per second, until the map number being commanded by the unit 30 is sensed. Thereafter, the strip 11 will be driven at a lower rate of speed, such as one inch per second, until the commanded substation on the appropriate map is registered with the horizontal reference line 26 of the indicator 27. The strip 11 then is to be transported in accordance with the rate of change in geographical latitude of the aircraft position until a different map number is commanded by the unit 30.

In the preferred embodiment of the display apparatus shown in FIG. 3, a length of the map strip 11 is driven at the appropriate speed by a pair of spaced drive rollers 36 and 37 in order to reduce the inertia of the system for more precise strip segment positioning. The drive roller 36, when driven in the reverse direction, provides strip 11 through a slack loop 38 to a reel 39, and, when driven in the forword direction, withdraws strip 11 from the reel 39. When the loop 38 exceeds a predetermined maximum size, as when the strip 11 is being driven in the reverse direction, the reel 39 is driven by a reel driver 40 to take up map strip 11. Similarly the roller 37 normally feeds map strip 11 through a slack loop 41 from which the map strip 11 is normally withdrawn by a reel 42 driven by a driver 43. The driver 43 functions to cause the reel 42 to reduce the size of the loop 41 when it increases to a predetermined maximum size and, also, allows strip 11 to be withdrawn from the reel 42 when the strip 11 is being driven in the reverse direction. The specific configurations of the reel drivers 40 and 43 are not disclosed since they are well known by those skilled in the art.

In order to drive the map at the high speed for searching for a commanded map number, a transport motor 44 is provided which is interconnected through a clutch system 45 when a control signal, $\overline{MNM}$, from the logic 31 is a ZERO in the map number made to cause the rollers 36 and 37 to be driven by the motor 44 in the appropriate direction. The motor 44 is controlled by a conventional transport motor control 46 which responds to one of a pair of direction signals U and V, i.e., forward and reverse, both to start the motor 44 and cause it to drive the strip 11 in the appropriate direction. A brake 47 is also connected to the drive rollers 36 and 37 to stop the strip 11 in response to a control signal, MB, provided by the control logic unit 31 when the sensor unit 35 detects the coded number of the map being commanded by the unit 31.

In order to drive the map at a lower speed for finding the appropriate station and substation of a particular map and to drive the strip 11 when in the track mode, a stepper motor 48 is provided which is also interconnected by the clutch system 45 with the drive rollers 36 and 37 when the signal $\overline{MNM}$ is a ONE, indicating that the commanded map number has been detected. The stepper motor speed and direction is controlled by a conventional stepper motor control 49 which responds to direction and speed signals X, Y and Z provided thereto by the map transport control logic unit 31.

MAP CODE SENSOR UNIT

The map code sensor unit 35, shown in FIG. 3, is generally of a photosensitive type and includes a photo-detector array 50 and a light source array 51 arranged to confront each other on opposite sides of the map strip 11 extending from the drive roller 36. The map strip 11 is suitably guided by rollers to be moved along a path extending beyond the arrays 50 and 51 and past the display area 29, to the drive roller 37. The photo-detector array 50 includes a plurality of photo-detectors (not shown) such as N-P-N planar silicon light sensors each for providing a respective one of the signals MD1–MD4, SD1–SD4, and SSD1–SSD16 and each spaced from and registered with respective ones of a corresponding plurality of map light sources 53–56, station light sources 57–60, and substation light sources 61–76 whose collective arrangement forming the light source array 51 is shown in FIG. 4. Suitably small solid state devices such as P-N planar gallium arsenide diode light sources are commercially available. The photo-detectors and light sources are preferably recessed in respective printed circuit boards which are arranged to slidingly contact the respective confronting side of the strip 11. The map strip 11 normally blocks the passage of light from the sources to their corresponding detectors. When a coded map hole 19, 21 or 23 is interposed in registration with one of the light sources and its corresponding detector, the corresponding detector provides a ONE output signal.

The map light sources 53–56 and the station light sources 57–60 are arranged in respective linear arrays which extend obliquely to the path of map movement at the angles $\theta_m$ and $\theta_s$. The substation light source 61 is physically aligned with the map light source 53 so the source 61 is spaced the distance A from the horizontal diameter of the display area 29. Thus the plate 15 of the jig 13 could be positioned over the array 51 with its holes 18, 20 and 22 for the first substation of the first station in registration with the light sources 53–56, 57 and 61.

The equally spaced substation lights 61–76 are arranged in a linear array extending parallel to the path of map movement so that the substation holes 21 punched in the map strip 11 each, in turn, register successively with each of the substation light sources 61–76 in order. The center-to-center spacing between successive substation light sources is equal to the width E of the substation areas. Thus, as shown in FIG. 4, the array of substation light sources 61–76 extends one substation width E less than the distance B between successive stations shown in FIG. 2 so that the map strip 11 is moved forward exactly one substation width E between the point at which the substation hole 21 for a station registers with light source 76 and the point at which the substation hole 21 for the next succeeding station registers with light source 61.

Each of the map light and station light sources 53–60 is directly connected to a light source power supply 78 so that they are ON during operation of the apparatus. Each of the substation lights 61–76, however, is connected through a respective switch such as one of a plurality of AND gates 79 with the light source power supply 78 so that they are each normally OFF unless the associated AND gate is being enabled by a corresponding one of the signals $SSL_n$ provided thereto by the map transport control logic 31.

MAP TRANSPORT CONTROL LOGIC UNIT

The look-up unit 30 shown in FIG. 3 provides to a buffer register 80 in the logic unit 31 three four-bit binary signals $CM_n$, $CS_n$ and $CSS_n$ each indicative of a respective one of the appropriate map number, station number and substation number for the map strip area to be displayed. The buffer register 80 generaly is of the type which provides at its parallel output terminals the digital signals applied thereto as an input signal and also provides the complements thereof. The complementing buffer register 80 could be a part of the output stage of the unit 30 where such an interface between components is not desired. In the event that the unit 30 is providing a relatively unstable or unreliable output signal, the look-up unit 30 provides a hold signal CH which is applied to the register 80 to cause it to hold its output signal conditions in spite of changes in the input signal conditions.

The control logic unit 31 includes a map number logic unit 81 for providing the map transport apparatus 32 with the transport motor direction signals U and V, the braking signal MB and the signal $\overline{MNM}$. The map number logic unit 81 is connected to receive the four-bit binary map number $CM_n$ and its complement $\overline{CM}_n$ from the buffer 80 and to receive the map number detector output signal $MD_n$ from the photo-detector array 50 in the map code sensor unit 35. The map unit 81 supplies complementary signals MNM and $\overline{MNM}$ indicative of whether or not the commanded map number has been sensed to a mode control unit 82.

The mode control unit 82, in turn, supplies the forward and reverse direction signals X and Y and a pulse train comprising a speed signal Z to the stepper motor control 49 which operates the stepper motor 48 after the commanded map number has been sensed. The mode control unit 82 provides a station mode signal SM and a substation mode signal SSM, respectively, to a station number logic unit 83 and a substation logic unit 84 to enable searching for and sensing the commanded station and substation. The mode control unit 82 further provides an output signal TM, indicative of a track mode of operation, to the reel drivers 40 and 43 to reduce the speed at which the reels 39 and 42 tend to be driven to take up the strip 11, when appropriate, after the commanded substation has been detected. The mode control unit 82 also automatically readjusts the condition of the direction signals X and Y and the frequency of the speed signal Z so that the map strip 11 can be driven in accordance with the changes in the latitude of the aircraft position.

The station number logic unit 83 is connected both to receive the commanded station number signal $CS_n$ and its complement $\overline{CS}_n$ from the register 80 and the signal $SD_n$ from the photo-detector array 50. The substation logic unit 84 is connected both to receive the commanded substation signal $CSS_n$ from the register 80 and the detected substation signal $SSD_n$ from the array 50. The functions of the station number and substation logic units 83 and 84 include providing ONE output signals SR and SSR to the mode control unit 82, respectively, when the commanded station number and the commanded substation have been detected by the map code sensor unit 35. The substation logic unit 84 responds to the commanded substation signal $CSS_n$ to activate the appropriate one of the AND gates 79 and cause the corresponding one of the substation light sources 61–76 to be turned ON.

MAP NUMBER LOGIC UNIT

In order that the map number logic unti 81 of FIG. 5 may provide the complementary signals $\overline{MNM}$ and MNM indicative as to whether or not the commanded map number has been sensed, the signals CM1–CM4 comprising the parallel digital commanded map number $CM_n$ from the buffer register 80 and the detected map number bit signals MD1–MD4 from the photo-detector array 50 are applied to a comparator 90. The map number detector signals MD1–MD4 which are provided by the detectors associated with the sources 53–56 are fed to a complementing storage register 91 which, upon being updated in a manner hereinafter explained, provides the parallel detector signal complements $\overline{MD1}$–$\overline{MD4}$ to the stages of a full binary adder 92 which are each connected to receive the corresponding bit of the commanded map number represented by the signals CM1–CM4. For example, the least significant signals CM1 and $\overline{MD1}$ are applied to the least significant stage 92a of the adder 92, while the most significant signals CM4 and $\overline{MD4}$ are applied to the most significant stage 92d. The adder 92 also provides a carry output signal MAC from its most significant stage 92d. The sum output signals of each of the adder stages 92a–92d are applied to an AND gate 93 whose output signal is fed through a noise filter 94 and comprises the map number mode response signal MNR of the comparator 90. Any time that the input signals to any one of the stages 92a–92d are either both ONE's or are both ZERO's, the output signal MNR is a ZERO. When the number represented by the signals MD1–MD4 is the same as the commanded map number represented by the signals CM1–CM4, the comparator output signal MNR will be a ONE.

Because of the coding sequence selected for the map numbers, when all of the bits of the commanded map number $CM_n$ are ZERO, a failure on the part of the unit 30 is indicated as when the control logic 31 is disconnected from the look-up unit 30. The complementary signals $\overline{CM1}$–$\overline{CM4}$ are fed from the buffer 80 to an AND gate 95 whose output signal is fed to an OR gate 96 along with the failure signal CF from the look-up unit 30. The output signal of the OR gate 96 is fed through a noise filter 97 and comprises a map failure signal MF which is applied to clear the storage register 91 so that the complementary output signals $\overline{MD1}$–$\overline{MD4}$ all become ONE's. The comparator outptu signal MNR, therefore, becomes a ONE if the signals CM1–CM4 are all ZERO's.

The signals MF and MNR are applied to an OR gate 98 whose output signal $\overline{MNM}$ indicates that the apparatus is not in the map number mode. The $\overline{MNM}$ signal is applied through a noise filter 99 to an inverter whose output signal MNM in a ONE condition indicates that the apparatus is in the map number mode wherein the transport motor 44 causes the strip 11 to be driven at high speed, such as twelve inches per second, in the proper direction for sensing the commanded map number represented by $CM_n$.

In order to control the direction of strip movement in the map number mode, the map number logic unit 81 includes a transport motor direction control 102 having a pair of AND gates 103 and 104 each connected to receive the signal MNM. The AND gate 103 is connected to receive the signal MAC, and the AND gate 104 is connected to receive the signal $\overline{MAC}$ provided by an inverter 105 connected to receive the signal MAC. The output signals U and V of the AND gates 103 and 104 are fed to the transport motor control 46. When the output signal U becomes a ONE, the transport motor 44 is started and causes the strip 11 to be driven in a direction which has been arbitrarily designated as forward, the indicator 27 appearing to move from south to north relative to the map strip 11. When the outnut signal V of the AND gate 104 becomes a ONE, the transport motor 44 is started and causes the strip 11 to be driven in the reverse direction. Thus, when the display apparatus is in the map number mode, the signal MNM will be a ONE, and the transport motor 44 will be driving the strip 11 in one direction or the other since the signal MAC will either be a ONE or a ZERO.

The advantage of using the complementing register 91 in combination with the adder 92 to provide the output signal $\overline{MNM}$ indicative that the commanded map number $CM_n$ has been sensed is best illustrated by the following examples. Let the commanded map number $CM_n$ be a binary five, i.e., 0101. Let the map number detector signal $MD_n$ from the map code sensor unit 35 be a binary two, i.e., 0010. The sum of 0101 and the four complemented bits of a binary two, i.e., 1101, is the five-bit binary number 10010, the carry output signal MAC of the adder 92 being a ONE. Since only stage 92b of the adder 92 is providing a ONE output signal, the comparator output signal MNR is a ZERO, and the signal MNM is a ONE. Therefore, the output signal U of the AND gate 103 is a ONE, and the map strip 11 is transported in the forward direction which is the direction in which the map strip 11 must be driven in order to display map number five.

Suppose, however, that the comanded map number $CM_n$ is a binary two, i.e., 0010, and that the map number detector signal $MD_n$ is a binary three, i.e., 0011. The sum of 0010 and the complemented bits of 0011 is the five digit binary number 01110, the carry output signal MAC being a ZERO. Again, the signal MNR is a ZERO, and the signal MNM is a ONE since the output of signal stage 92a is a ZERO. The output signal V of the AND gate 104 becomes a ONE so that the motor 44 causes the strip 11 to be driven in the reverse direction, i.e., that direction in which the strip 11 must be moved to enable the detection of commanded map number two.

When the commanded map number $CM_n$ is detected or when there is a failure, the signal $\overline{MNM}$ becomes a ONE, and both U and V become ZERO's causing the transport motor 44 to become disconnected from its power supply (not shown) by the control 46 and stop. To brake the strip 11 to a stop, the signal $\overline{MNM}$ is applied to a one-shot multivibrator 106 whose ONE output signal has a duration of about 0.2 second and is applied to an AND gate 107 along with the signal $\overline{MNM}$. The output signal of the AND gate 107 is the map brake signal MB which, in a ONE condition, causes the brake 47 to slow and stop the map strip 11. The combination of the one-shot multivibrator 106 and the AND gate 107 prevents accidental braking should the signal $\overline{MNM}$ become a ONE for a shorter period of time because of noise.

In order to enable the parallel digital map number detector signal $MD_n$ to be read into the complementing storage register 91 at the optimum time when all the map number holes 19 which are present may most likely be detected, the map number logic unit 81 includes a detected map number read-in control 110 having an OR gate 111 connected to receive the bit signals MD1–MD4 from the photo-detector array 50. The output signal of the OR gate 111 is applied along with the signal MNM to a three-input AND gate 112 whose output signal is applied to cause the complementing storage register 91 to be updated. The output signal of the OR gate 111 is also applied to trigger a one-shot multivibrator 113 whose rectangular output pulse MV1 is fed to a spike generator 114 and has a duration such as five milliseconds calculated to be that time at which the map number holes 19 will most likely be registered with the corresponding ones of the map light sources 53–56 and the associated map number bit detectors in the photo-detector array 50. The above-noted duration is set equal to one-half of the probable average duration of the signals MD1–MD4 as affected by both the strip speed in the map number mode of about twelve inches per second and the diameters of the map number holes 19. The trailing edge of the signal MV1 causes the spike generator 114 to produce an output spike MV2 which is applied to the third input terminal of the AND gate 112 and causes the register 91 to be updated. In order to prevent noise from causing the register 91 to be updated, the output signal of the AND gate 112 is applied to a one-shot multivibrator 115 whose rectangular output signal MV3 has a relatively long duration such as about 200 milliseconds compared to the anticipated duration of the ONE condition of the signals $MD_n$ in the map number mode of operation. The rectangular signal MV3 is applied to the multivibrator 113 to inhibit provision of another output signal MV1 when none, or only some, of the same map number holes 19 are still in registry with the associated light sources 53–56.

STATION NUMBER LOGIC UNIT

The station number logic unit 83, shown in FIG. 6, functions to provide the mode control unit 82 with the signal SR for indicating whether or not the commanded station has been detected. The commanded station number signal $CS_n$ includes the bit signals CS1–CS4 which are applied to a comparator 120, each to one input of a respective one of the exclusive OR gates 121–124. Each of the exclusive OR gates 121–124 also is connected to receive as its other input the corresponding one of the signals SD1–SD4 provided by the station detectors in the array 50 which are associated with the sources 57–60 of the array 51. The outputs of the exclusive OR gates 121–124 are fed through an OR gate 125 to an inverter 126 whose output signal comprises the output signal of the comparator 120 which is applied to an AND gate 127. If there is any difference between the detected station number signal $SD_n$ and the commanded station number signal $CS_n$, one or more of the exclusive OR gates 121–124 will have an output signal which is a ONE and which is inverted to a ZERO by the inverter 126. When each of the station number detector output signals SD1–SD4 is the same as the corresponding one of the bit signals CS1–CS4 of the commanded station number, the comparer 120 will provide an output signal which is a ONE.

Since the binary number 0000 does not represent any assigned station number, the signals $\overline{CS1}$–$\overline{CS4}$ comprising the complement of the commanded station number signal $CS_n$ are applied to an AND gate 128 whose output signal SF indicates that a failure has occurred. The signal SF is inverted by an inverter 129 and is applied to an input of the AND gate 127 so that when the above-described failure occurs the output signal of the AND gate 127 must be a ZERO.

The AND gate 127 is also connected to receive the station mode signal SM from the unit 82 so that the output signal of the gate 127 cannot be a ONE unless the station mode signal SM is a ONE. The output signal of the AND gate 127 is fed through a noise filter 130 and comprises the station response signal SR fed to the mode control unit 82.

As described above with respect to the map number logic unit 81 of FIG. 5, the map transport apparatus 32 is normally controlled so that the displayed portion of the strip 11 is braked to a stop when the commanded map number has been detected. Thereafter, in a manner hereinafter explained, the mode control unit 82 causes the stepper motor 48 to drive the strip 11 in the forward direction at a lower speed, such as one inch per second, until the commanded station and substations are detected. Because of the inertia of the moving strip 11 when being driven by the transport motor 44, the strip 11 most probably will not be stopped so that the map number holes 19 and the station number one hole 23 are still in registry with the map and station number detectors and their associated sources 53–56 and 57 in the arrays 50 and 51. Should the strip 11 be stopped at a position to display a portion of the preceding map which lies forward of station one of the commanded map whose number has just been detected, as when the strip 11 was being transported in the reverse direction by the motor 44, driving the strip 11 forward with the stepper motor 48 will enable the commanded station one to be detected. However, where the display station is being commanded and where the motor 44 has driven station one to a position forward of the indicator reference line 26, the station number logic unit 83 includes circuitry for providing to the mode control unit 82 a station reversal response signal, SRR, in a ONE condition when station two is detected. The mode control unit 82 responds thereto, as hereinafter explained, to cause the stepper motor 48 to drive the strip 11 in the reverse direction until commanded station one is detected. To produce the signal SRR the detector output signal SD2 is applied through a noise filter 131 along with the signal CS1 and the complementary signals $\overline{CS2}$, $\overline{CS3}$, and $\overline{CS4}$ to the inputs of an AND gate 132 whose output signal is the signal SRR.

SUBSTATION NUMBER LOGIC UNIT

The substation logic unit 84, shown in FIG. 7, includes circuitry for causing a particular one of the substation light sources 61–76 to be activated so that the associated one of the photo-detectors in the array 50 can produce a ONE output signal upon the registration therewith of the substation coding hole 21. The unit 84 includes a four input bit binary decoder 140 for decoding the four-bit binary signal CSS1–CSS4 from the buffer register 80 and provide a parallel output signal $SSL_n$ one of which is a ONE and all of which are applied to respective ones of the AND gates 79 for causing the correct one of the light sources 61–76 to be actuated. The output signals SSD1–SSD16 from the substation detectors in the array 50 which are each associated with a corresponding one of the sources 61–76 are fed to an OR gate 141 whose output signal is applied to an AND gate 142 along with the station mode signal SSM supplied thereto by the mode control unit 82. The output signal of the AND gate 142 is fed through a noise filter 143 and comprises the output signal SSR of the substation number logic unit 84 which is fed to the mode control unit 82. The coding scheme for the substation number differs from that for the map and station numbers in that the binary input signal $CSS_n$ of 0000 causes the substation one light source 61 to be actuated, the binary input signal 1111 causing activation of the substation sixteen light source 76.

MODE CONTROL UNIT

Figure 8:
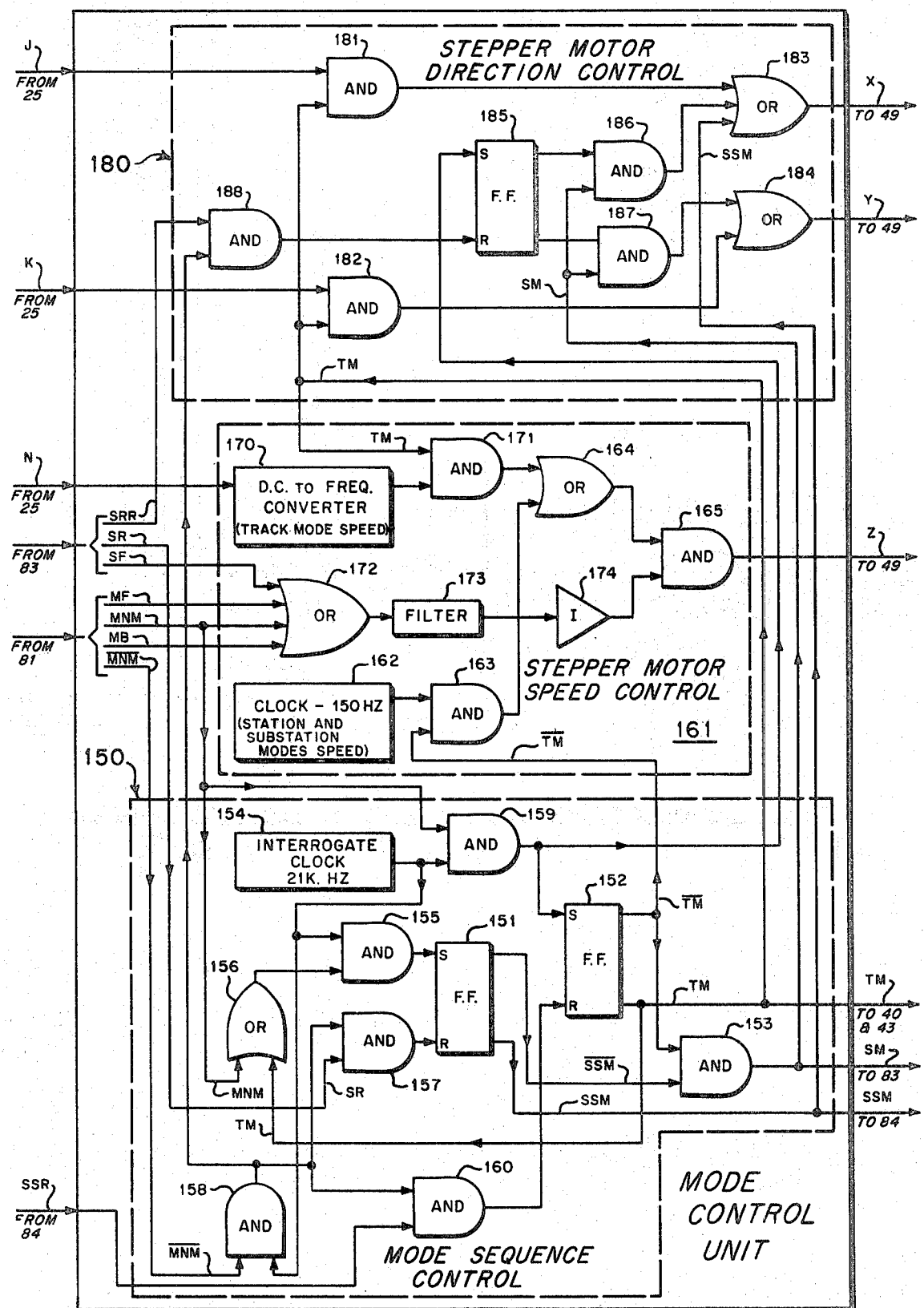
FIG. 8 represents a block diagram of a mode control unit of the apparatus of FIG. 3.

The primary function of the mode control unit 82, shown in FIG. 8, is to control the direction and speed of the stepper motor 48 in accordance with whether the apparatus is in the map number mode, the station mode, the substation mode, or the track mode. In order to provide the signals TM, SM, and SSM, the mode control unit 82 includes a mode sequence control 150 having a first set-reset flip-flop 151 whose rest output signal comprises the substation mode signal SSM applied to the substation logic unit 84 and having a second set-reset flip-flop 152 whose set output signal $\overline{TM}$ in a ONE condition indicates that the apparatus is not in the track mode and whose reset output signal TM is applied to the reel drivers 40 and 43 for causing, in a ONE condition, a reduction of the speed at which the drivers tend to drive their associated reels 39 and 42 to take up strip 11. The set output signals $\overline{SSM}$ and $\overline{TM}$ of the flip-flops 151 and 152 are both applied to an AND gate 153 whose output signal is the station mode signal SM which is fed to the station number logic unit 83.

In order to reduce errors which could be introduced by noise, the mode sequence control 150 includes an interrogate clock 154 providing a train of rectangular pulses having, for example, a frequency of about 21 kHz. to enable the use of what is, in effect, output level detection circuitry for setting and resetting the flip-flops 151 and 152. The frequency of the clock 154 is preferably chosen to be at least two orders of magnitude greater than that frequency whose period has a duration corresponding to the anticipated duration, e.g. 10 milliseconds, of the map number detector signal $MD_n$ from the array 50 when the strip 11 is being moved at high speed by the transport motor 44. The changes in the states of the flip-flops 151 and 152 therefore appear to be relatively instantaneous.

The flip-flop 151 is set by the output signal of an AND gate 155 connected to receive both the train of pulses from the clock 154 and the output signal of an OR gate 156 in turn connected for receiving both the map number mode signal MNM from the map number logic unit 81 and the reset output signal TM of the flip-flop 152. The flip-flop 151 is reset by the output signal of an AND gate 157 in turn connected for receiving both the station response signal SR from the station number logic unit 83 and the output signal of an AND gate 158. The AND gate 158 is connected for receiving both the train of pulses from the clock 154 and the signal $\overline{MNM}$ from the map number logic unit 81.

The signal MNM and the train of pulses from the clock 154 are applied to an AND gate 159 whose output signal, in turn, is applied to set the flip-flop 152. The output signal of the AND gate 158 is applied along with the substation response signal SSR from the substation logic unit 84 to an AND gate 160 whose output signal is applied to reset the flip-flop 152.

In order to provide the train of pulses having the appropriate frequency for station and substation searching and comprising the speed signal Z fed to the stepper motor control 49, the mode control unit 82 includes a stepper motor speed control 161 which includes a clock 162 providing a train of pulses having, for example, a frequency of about 150 Hz. The frequency of clock 162 is chosen in connection with the distance which the stepper motor 48 causes the strip 11 to be moved in response to a single pulse, e.g. about 0.007 inch, so that the motor 48 can be caused to drive the map strip 11 at a low station and substation searching speed of about one inch per second. The output signal of the clock 162 is fed along with the set output signal $\overline{TM}$ from the flip-flop 152 in the mode sequence control 150 to an AND gate 163 whose output signal is applied through an OR gate 164 to an AND gate 165. The output signal of the AND gate 165 comprises the speed signal Z of the mode control unit 82.

In order to drive the map 11 when in the track mode in accordance with the changes in the aircraft position latitude, the stepper motor speed control 161 also includes a D.C. to frequency converter 170 connected to receive the analog output signal N which is representative of the rate of change of longitude and is provided by the computer 25. The converter 170 responds to the signal N for providing a series of pulses to an AND gate 171. From the example above, the stepper motor 48 moves the strip 11 about 0.007 inch each time a pulse is supplied to its control 49. The frequency of the rectangular pulses from the converter is, therefore, properly scaled so that the strip 11 will be driven by the motor 48 past the indicator reference line 26 at a rate which corresponds to the rate of indicated latitudinal change relative to the scale of the particular map which is being displayed in the area 29.

The AND gate 171 is connected for receiving both the reset output signal TM from the flip-flop 152 in the mode sequence control 150 and the output signal of the AND gate 171. The output signal of the AND gate 171 is applied through the OR gate 164 to the AND gate 165. When the apparatus is not in the map number mode, the stepper motor 48 will be driven by pulses derived either from the frequency converter 170 or the clock 162 depending upon whether or not the apparatus is in the track mode of operation.

At certain times it is not desirable to pulse the stepper motor 48 at all such as when the apparatus is in the map number mode and is searching at high speed for the commanded map number or when the brake 47 is being actuated or in the event of an apparatus failure. Therefore, the speed control 161 includes an OR gate 172 which is connected to receive the station failure signal SF from the station unit 83 and the map failure, map number mode, and map brake signals MF, MNM, and MB from the map number logic unit 81. The output signal of the OR gate is applied through a noise filter 173 to an inverter 174 whose output signal is applied to the AND gate 165. When any of the input signals to the OR gate 172 is a ONE, the output signal of the inverter 174 becomes a ZERO, and none of the pulses being applied to the AND gate 165 will be fed to the stepper motor control 49.

As indicated above, the map strip 11 is ordinarily driven in the forward direction when the display apparatus is in station and substation modes. The direction of strip movement is to be controlled by the computer 25 when the apparatus is in the track mode. The mode control unit 82 further includes a stepper motor direction control 180 which has a pair of AND gates 181 and 182 each connected to receive the reset output signal TM from the flip-flop 152 in the mode sequence control 150. The other inputs of the AND gates 181 and 182 are connected to receive a respective one of the complementary north and south direction signals J and K being provided by the mode control unit 82 by the computer 25. The output signals of the AND gates 181 and 182 are applied to respective OR gates 183 and 184 whose output signals respectively comprise the forward and reverse direction signals X and Y of the mode control unit 82 which are applied to the stepper motor control 49. Since the apparatus is always to drive the strip 11 in the forward direction when in the substation mode, the reset output signal SSM from the flip-flop 151 in the mode sequence control 150 is also applied to the OR gate 183. When the apparatus is in the station mode, the strip 11 is normally driven in the forward direction except for the special case when station one is being commanded and station two, for example, is detected. The stepper motor direction control 180 includes a set-reset flip-flop 185 whose set output signal is applied to an AND gate 186, the output signal of which is applied to the OR gate 183. The reset output signal of the flip-flop 185 is applied to an AND gate 187 whose output signal is applied to the OR gate 184. Each of the AND gates 186 and 187 is connected to receive as its other input signal the station mode signal SM from the AND gate 153 of the mode sequence control 150. The flip-flop 185 is connected to be set by a ONE output signal of the AND gate 159 in the mode sequence control 150, i.e. when the apparatus is in the map number mode. In order to cause the special case reversal of the direction of the stepper motor 48, the flip-flop 185 is connected too be reset by a ONE output signal of an AND gate 188 which, in turn, is connected to receive both the signal SRR from the station logic unit 83 and the output signal of the AND gate 158 of the mode sequence control 150. Therefore, the flip-flop 185 can only be reset when the apparatus is not in the map number mode and the signal SRR is a ONE, which ONE signal conceivably can occur while the apparatus is in the map number mode.

SUMMARY OF OPERATION

Figure 9:
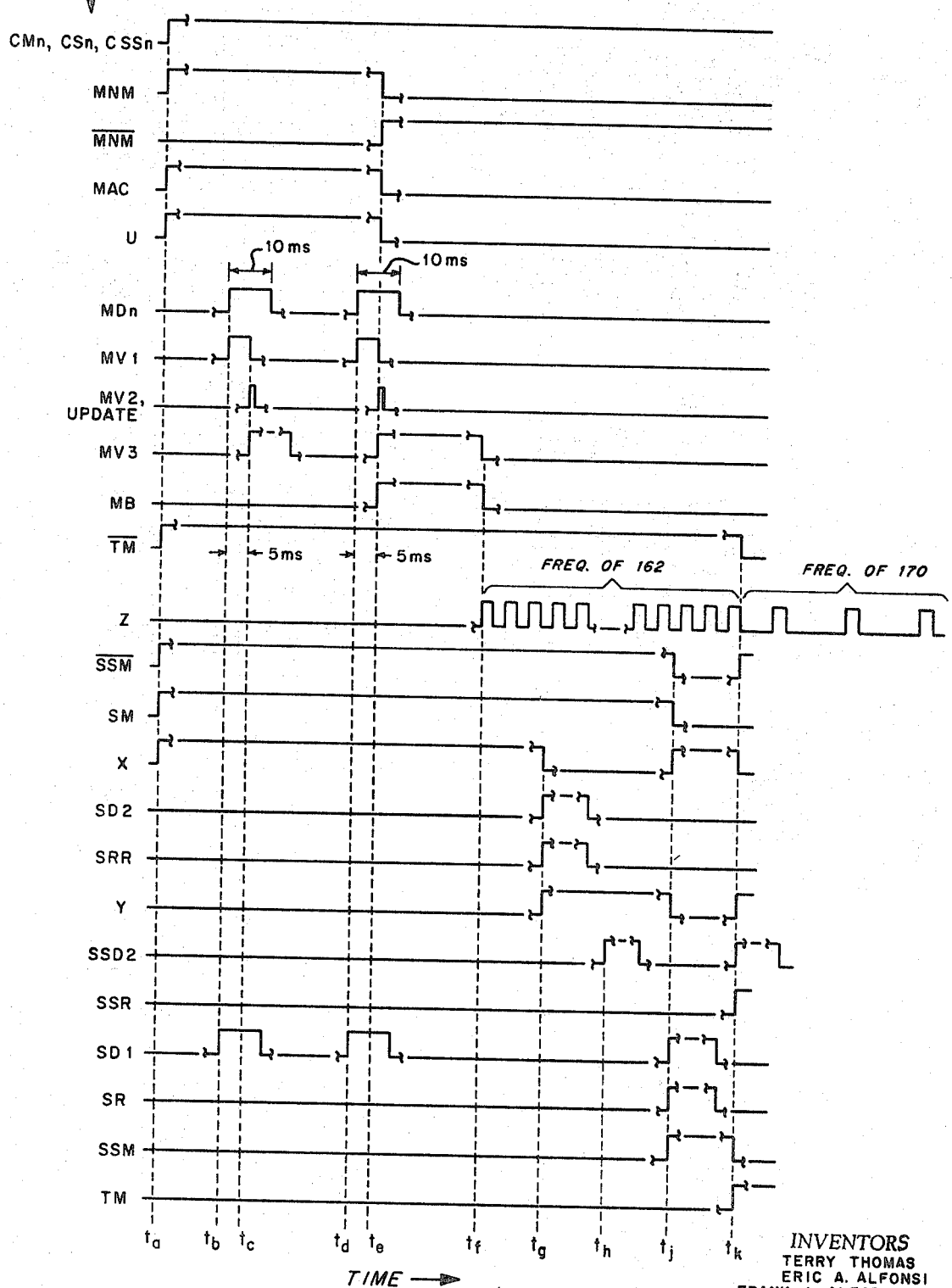
FIG. 9 represents a timing diagram of the conditions of various digital signals during the operation of the apparatus of FIG. 3.

The operation of the apparatus may be better understood by reference to the exemplary waveform timing diagram of FIG. 9. Let it be supposed, for example, at time $t_a$ that the strip 11 is positioned to display map number one, station number one, substation number two, that the complementing storage register 91 in the map number logic of unit 81 of FIG. 5 is cleared causing the complementary output signals $\overline{MD1}$–$\overline{MD4}$ all to be ONE's, and that the computer 25 causes the look-up unit 30 to command the display of map number three, station one, substation two. As soon as the look-up unit 30 ascertains the appropriate signals $CM_n$, $CS_n$ and $CSS_n$ in accordance with the longitude and latitude signals G and H, it also can provide the scale and field of view boundary signals, CA and CB, to the generator 33. The generator 33, in accordance with the longitudinal signal G, provides the signal R to the driver 34 which correspondingly transversely positions the indicator 27.

As soon as the commanded map number signal $CM_n$ appears, signal MNM will assume a ONE condition because 0011, the commanded map number signal $CM_n$, plus 1111, the output signal $\overline{MD}_n$ from the register 91, equals 10010. Since the signal MAC from the adder 92 becomes a ONE, the output signal U of the AND gate 103 becomes a ONE, and the transport motor 44 will begin to drive the strip 11 in a forward direction at the relatively high map number search rate such as twelve inches per second.

Referring to the mode control unit 82 of FIG. 8, when the signal MNM becomes a ONE, the output signal of the AND gate 159 sets both the flip-flop 152, which provides the not track mode signal $\overline{TM}$ in a ONE condition, and the flip-flop 185, which applies a ONE signal to the AND gate 186. Since MNM has become a ONE, the flip-flop 151 is set by the output signal from the AND gate 155 and provides the not substation mode signal $\overline{SSM}$ in a ONE condition. Consequently, the AND gate 153 provides the station mode signal SM in a ONE condition which causes the AND gate 186 to provide a ONE signal through the OR gate 183, i.e. the signal X. Although the signal X is a ONE, the stepper motor 48 is not actuated since the AND gate 165 does not transmit any pulses from the clock 162 because, MNM being a ONE and the output signal of the OR gate 172 being a ONE, the signal which the inverter 174 applies to the AND gate 165 is a ZERO.

At somt time $t_b$ thereafter, the map coding hole 19 for map two and the station coding hole 23 for station one will be detected. The signal $MD_n$ which includes the signal MD2 being in a ONE condition for about ten milliseconds is applied to the OR gate 111 of the detected map number read in control 110 of the map number logic unit 81 of FIG. 5. The one-shot multivibrator 113 is triggered by the ZERO to ONE transition of the signal MD2 and provides the rectangular pulse MV1 having a duration of about five milliseconds and whose transition from ONE to ZERO causes the generator 114 to produce at time $t_c$ the spike MV2 which is passed through the AND gate 112 to update the register 91. Since the complement 1101 of the signal $MD_n$ plus 0011, the signal $CM_n$, equals 10000, the map number mode signal MNM and the signal MAC both remain in a ONE condition, the commanded map number signal $CM_n$ being greater than the detected map number signal $MD_n$.

At time $t_d$ map number three is detected, i.e. MD1 and MD2 becomes ONE's. As before, the multivibrator 113 is triggered to provide the rectangular pulse MV1 whose trailing edge triggers the spike generator 114, causing the register 91 to be updated at time $t_e$. The complement 1100 of the detected map number $MD_n$, i.e. 1100, plus the commanded number $CM_n$, i.e. 0011, equals 01111, the signal $\overline{MNM}$, therefore, becoming a ONE, and the signal MAC becoming a ZERO. Since the map number mode signal MNM becomes a ZERO, the signal U from the AND gate 103 becomes a ZERO, and the transport motor 44 stops. The one-shot multivibrator 106 is triggered by the transition of the signal $\overline{MNM}$ to a ONE condition to provide the braking signal MB in a ONE condition.

The braking signal MB returns to a ZERO at time $t_f$, i.e. about two-tenths of a second after time $t_e$. Since signal $\overline{TM}$ is a ONE and since all of the signals MB, MF, MNM and SF applied to the OR gate 172 of the stepper motor speed control 161 in the mode control unit 82 of FIG. 8 are ZERO's, the AND gate 165 is enabled to pass the rectangular pulses being provided by the clock 162 through the AND gate 163. As noted above in connection with the discussion of time $t_a$, the forward direction signal X from the stepper motor direction control 180 of the mode control unit 82 is a ONE. The mode control unit 82, therefore, provides the series of pulses comprising the speed signal Z to the stepper motor control 49 which signal Z has the appropriate frequency for causing the strip 11 to be driven in the forward direction at the low rate of speed, e.g. one inch per second, for searching for the commanded station and substation.

Since the map transport apparatus 32 is unable to stop the strip 11 exactly at the station one of the commanded map, at some time $t_g$ station two will be detected, i.e. the signal SD2 becomes a ONE. Referring to FIG. 6, the AND gate 131 in the station logic unit 83 will then provide the station reversal response output signal SRR in a ONE condition since the signals $\overline{CS2}$, $\overline{CS3}$, $\overline{CS4}$ and CS1 are all ONE's. Referring to FIG. 8, since the signal SRR is a ONE and the signal from the AND gate 158 in the mode sequence control 150 of the mode control unit is a ONE because $\overline{MNM}$ is a ONE, the AND gate 188 of the stepper motor direction control 180 will reset the flip-flop 185 so that the AND gate 187 causes the OR gate 184 to provide the reverse signal Y in a ONE condition to the stepper motor control 49 of FIG. 3, signal X becoming a ZERO. Thereby the stepper motor 48 is caused to reverse its direction so that the indicator 27 appears to be moving south relative to the strip 11.

At some time $t_h$ the substation hole 21 for station one will pass over the substation light source 62 so that the associated detector provides the signal SSD2 in a ONE condition. Referring to FIG. 7, the signal SSR from the filter 143 of the substation logic unit 84 will remain in a ZERO condition since the signal SSM from the set flip-flop 151 of mode sequence control of the mode control unit 82, FIG. 8, is a ZERO. As the hole 21 moves beyond its position of registration, the signal SSD2 returns to ZERO.

At time $t_j$ the station number code hole 23 for station one will be registered with the station light source 57 and its associated detector so that the signal SD1 becomes a ONE, indicating that station one is being detected. Referring to FIG. 6, since the detected station number $SD_n$ is the same as the commanded station number $CS_n$, the comparer 120 will provide an output signal which is a ONE thereby causing the AND gate 127 to provide the ONE signal which when filtered comprises the station response signal SR in a ONE condition, the signals SM and $\overline{SF}$ then being ONE's. Referring to FIG. 8, the signal SR in a ONE condition enables the AND gate 157 to reset the flip-flop 151 so that the substation mode signal SSM changes to a ONE condition. Of course, when the set output signal $\overline{SSM}$ of the flip-flop 151 changes to a ZERO, the station mode signal SM provided from the AND gate 160 changes to a ZERO. The signal SSM in a ONE condition causes the OR gate 183 of the step motor direction control 180 to provide the forward signal X in a ONE condition, thereby causing the stepper motor 48 to move the strip 11 in the forward direction since the change of the signal SM to a ZERO forces the output of the AND gate 187 to return to a ZERO, preventing the simultaneous provision of a ONE reverse signal Y. Of course, the clock 162 is still controlling the speed of the stepper motor 48 in the substation mode since the flip-flop 152 of the mode sequence control 150 has remained in a set condition.

At the time $t_k$ the substation hole 21 for substation two is again registered with the substation light source 62 so that the corresponding associated detector again provides the signal SSD2 in a ONE condition. Since the signal SSM from the flip-flop 151 of the mode sequence control 150 of FIG. 8 is now a ONE, the AND gate 142 of the substation logic unit of FIG. 7 provides its output signal SSR in a ONE condition. Since $\overline{MNM}$ is a ONE, the change of SSR to a ONE condition when applied to the AND gate 160 of the mode sequence control 150 of FIG. 8 resets the flip-flop 152 so that the signal TM becomes a ONE, the set output signal $\overline{TM}$ becoming a ZERO. When the signal TM becomes a ONE, the AND gate 155 sets the flip-flop 151 so that the set output signal $\overline{SSM}$ becomes a ONE, the reset output signal SSM becoming a ZERO. The station mode signal SM from the AND gate 160 remains in a ZERO condition since the signal $\overline{TM}$ has changed to a ZERO. When the signal $\overline{TM}$ becomes a ZERO, the AND gate 163 of the stepper motor speed control 161 is inhibited from passing pulses from the clock 162 to the OR gate 164. However, the AND gate 171 is enabled since the signal TM is a ONE and passes the pulses to the OR gate 164 from the D.C. to frequency converter 170 which is responsive to the signal N being provided thereto by the computer 25. Hence, as generally indicated in FIG. 9, when the track mode of operation begins at time $t_k$, the frequency of the speed signal Z being provided by the stepper motor speed control 161 to the stepper motor control 49 is switched from control by the clock 162 to control by the converter 170. In the particular example above, it was assumed that the computer is 25 is indicating to the mode control unit 82 that the latitude is changing in the south direction, i.e. K is a ONE, since the signal TM is a ONE, the AND gate 182 provides a ONE output signal to the OR gate 184 which changes the reverse signal Y to a ONE condition so that the stepper motor 48 begins driving the strip 11 in the reverse direction. Since the station mode signal SSM has become a ZERO, the OR gate 183 is not simultaneously providing a ONE forward signal X to the motor control 49.

From the above, it becomes apparent that the invention provides a strip positioning apparatus which is well suited for use in a novel navigational display apparatus. As indicated above maps having equal widths and including the respective desired fields of view which in composite display the area over which the aircraft could fly even though there is a deviation from its planned course can easily be obtained from readily available maps such as the transverse Mercator type. The maps are easily linked to form the strip 11, are easily coded and need not have the same scale. Since the display apparatus includes a look-up unit which picks out the appropriate map and the appropriate portion thereof in accordance with the latitude and longitude of the aircraft position, a display of the ground track occurs even though the aircraft may be a considerable distance off course. The map transport control logic 31 functions under the control of the look-up unit 30 to quickly cause the appropriate portion of the appropriate map to be automatically displayed in registration with the indicator 27, controlling the transport motor 44 until the commanded map number code is detected and thereafter controlling the stepper motor 48 for detecting the commanded station and substation codes. Any adverse effects attributable to noise have been eliminated by the incorporation of novel noise exclusion circuitry in the control logic 31. Should the commanded map number change, the apparatus automatically quickly positions the newly commanded map in registration with the indicator 27. If a failure occurs, the strip 11 is automatically stopped. Of course, the signals F, CF, MF and SF can be used to actuate appropriate indicators, not shown.

Since changes in latitude always represent the same change in north-south distance over the earth's surface, the display apparatus of the invention is well suited for inclusion in aircraft which fly long distances north and south, as from hemispher to hemisphere. The east-west position generator 33 of FIG. 3 is appropriately constructed so that its output signal R is appropriately scaled in response to the signal G applied thereto by the computer 25 for causing the servo indicator driver 34 to accurately register the indicator 27 with the displayed map the corresponding distance from a field of view boundary for the particular ranges of latitudes displayed on that map. Of course, for each particular map, an average value for longitudinal distance in terms of minutes and, if desired, seconds is chosen since the distance corresponding to the change in longitude in the southern portion of the map is somewhat greater than the distance corresponding to the same change in longitude in the northern portion of the map. This problem may be minimized by using maps of large scales.

Since the above-described display apparatus is computer driven, it is apparent that the display apparatus can be readily used without modification in aircraft cockpit simulation systems or in-flight training devices. The signals which would be provided by the navigational computer 25 during flight conditions can be simulated as by a computer which may also include the look-up unit 30 and the generator 33.

It should be understood, of course, that the foregoing disclosure relates only to a preferred embodiment of the invention, and that numerous modifications or alternations may be made without departing from the spirit and scope of the invention as set forth in the appended claims.

What is claimed is:

1. Apparatus for positioning in a predetermined place a predetermined transversely extending station area of a predetermined transversely extending portion of an elongated strip having arranged thereon pluralities of portion indicia and station indicia for identifying respectively each of a plurality of contiguous, transverse portions of the strip and each of a plurality of contiguous transverse station areas which in composite form a respective portion; said apparatus comprising:

signal means providing commanded station and commanded portion signals indicative of the predetermined station area of the predetermined portion of the strip;

transport means for transporting the strip along a strip movement path extending through the predetermined place, said transport apparatus including first motor means normally connected for driving the strip at a first rate and including second motor means alternatively connected for driving the strip at a lesser second rate in response to a first control signal;

sensor means arranged in sensing proximity to said path for sensing the portion indicia and the station indicia and for providing corresponding portion detection and station detection signals;

control means for controlling said transport means to position the strip and connected to said signal means and to said sensor means for receiving said commanded portion and station signals and said portion and station detection signals, said control means being responsive to the occurrence of identity between said portion detection signal and said commanded portion signal for providing said first control signal to said transport means;

said second motor means being responsive to a reversing signal for driving the strip along said strip movement path in a reverse direction;

said control means including motor reversing means for providing said reversing signal to second motor means in response to the concurrent occurrence of both a commanded station signal indicative of a first station area in a portion and of a station detection signal indicative of a station area arranged rearwardly of and in the same portion with the first station area, said motor reversing means ceasing to provide said reversing signal in response to the occurrence of identity between said commanded station signal and said station detection signal;

said signal means additionally providing a commanded substation signal indicative of a predetermined substation which is one of a plurality of contiguous substation areas of predetermined widths forming the predetermined station area of the predetermined portion of the strip;

said sensor means including substation detecting means connected for receiving said commanded substation signal for providing a substation detection signal in response to sensing the substation indicia arranged on the strip indicative of the predetermined substation area indicated by said commanded substation signal;

said control means including substation logic means connected for receiving said substation detection signal for providing a substation response signal;

said second motor means comprising stepper motor means responsive to a pulse train speed signal for driving the strip at the corresponding rate; and said control means further including stepper speed control means including pulse means providing a pulse train signal and gating means connected to receive said pulse train signal, said first control signal, and said substation response signal, said gating means being responsive thereto for applying said pulse train signal to said stepper motor means only during an interval terminating with a succeeding occurrence of said substation response signal.

2. Apparatus according to claim 1 wherein said substation detecting means includes:

a plurality of spaced apart substation indicia detector means arranged in an array extending parallel to said path and each being successively registerable with the substation indicia carried by the strip, said detector means being spaced apart distances corresponding to the predetermined widths of successive substation areas in the predetermined station areas of the predetermined portion of the strip; and detector actuating means connected to said signal means for receiving said command substation signal and being responsive thereto for causing a single one of said plurality of substation indicia detector means to provide upon registration of the substation indicia therewith said substation detection signal corresponding to the predetermined substation area.

3. Apparatus according to claim 2 wherein said sensor means comprises:

a first group of portion indicia light sources arranged in registry with one margin of said path each for directing a beam of light through translucent portion indicia transported into registry therewith;

a second group of station indicia light sources arranged in registry with the other margin of said path each for directing a beam of light through translucent station indicia transported into registry therewith;

a third group of substation indicia light sources arranged in an array extending parallel to the direction of said path each for directing beam of light through translucent substation indicia transported into registry therewith;

a plurality of detectors for providing said portion station and substation detection signals, each said detector being arranged on the obverse side of said strip movement path in alignment with a corresponding one of said light sources;

power supply means connected to actuate said portion and station indicia light sources; and actuating means connected to said signal means for receiving said commanded substation signal and connected to said substation indicia light sources and to said power supply, said actuating means being responsive to said commanded substation signal for actuating a corresponding single one of said substation indicia light sources.

4. Apparatus for positioning in a predetermined place a predetermined transversely extending station area of a predetermined transversely extending portion of an elongated strip having arranged thereon pluralities of portion indicia and station indica for identifying respectively each of a plurality of contiguous, transverse portions of the strip and each of a plurality of contiguous transverse station areas which in composite form a respective portion; said apparatus comprising:

signal means providing commanded station and commanded portion signals indicative of the predetermined station area of the predetermined portion of the strip;

transport means for transporting the strip along a strip movement path extending through the predetermined place, said transport apparatus including first motor means normally connected for driving the strip at a first rate and including second motor means alternatively connected for driving the strip at a lesser second rate in response to a first control signal;

sensor means arranged in sensing proximity to said path for sensing the portion indicia and the station indicia and for providing corresponding portion detection and station detection signals;

control means for controlling said transport means to position the strip and connected to said signal means and to said sensor means for receiving said commanded portion and station signals and said portion and station detection signals, said control means being responsive to the occurrence of identity between said portion detection signal and said commanded portion signal for providing said first control signal to said transport means;

said signal means and said sensor means each providing said commanded portion and said portion detection signals in a parallel digital form having plural bits indicative of the respective numbers of the commanded portion and detected portion area; and said control means comprising:

complementing means connected to said sensor means for receiving said portion detection signal and providing as a plural bit output signal the complements of each of the bits of said portion detection signal;

adder means having plural stages each connected to receive a respective bit of said commanded portion signal, each stage further being connected to receive the correspondingly significant bit of said complementing means output signal, said adder providing a sum output signal from each stage; and first AND gate means connected to receive said sum output signals from said stages of said adder for providing said first control signal.

5. Display apparatus according to claim 4 wherein:

said first motor means is responsive to first and second direction signals for driving the strip respectively in a forward direction and in a reverse direction;

said adder means provides a carry output signal from its most significant stage; and said control means further comprises:

means providing the complements of said first control signal and of said carry output signal;

second AND gate means connected to receive said carry output signal and said complement of said first control signal for providing said first direction signal to said first motor means; and third AND gate means connected to receive said complements of said first control and said carry output signals for providing said second direction control signal to said first motor means 6. Display apparatus according to claim 5 wherein:

said complementing means includes register means responsive to an update signal for storing said portion detection signal and providing said plural bit complementing means output signal; and said control means further comprises:

update control means connected to receive said portion detection signal and said complement of said first control signal for providing said update singal to said register means only when said portion detection signal and said complement of said first control signal are simultaneously present.

7. Display apparatus according to claim 6 wherein said update control means comprises:
first single-shot multivibrator means connected for triggering by said portion detection signal and providing a first pulse of predetermined duration half as long as a predetermined duration of said portion detection signal;
spike generator means connected to receive said first pulse and being responsive to the trailing transition of said pulse for producing a spike output signal;
fourth AND gate means connected to said register means and connected to receive said complement of said first control signal, said portion detection signal and said spike output signal for providing said update signal to said register means; and
second single-shot multivibrator means connected to receive said update signal for providing an inhibit signal to said first multivibrator means for duration less than a predetermined interval between succeeding portion detection signals occurring as the strip is driven at said first rate and at least one order of magnitude greater than said predetermined duration of said portion detection signal.

8. Display apparatus comprising:
an elongated map strip comprising a plurality of end-to-end linked maps displaying predetermined fields of view, each said map having a plurality of transversely extending station areas, said strip including coded map indicia and coded station indicia arranged for distinguishing each said map and each said station;
transport apparatus for transporting said strip along a strip movement path extending through a display area;
sensor means arranged in sensing proximity to said path for sensing registration of said coded map and station indicia and providing corresponding map detection signals and corresponding station detection signals;
computer means responsive to input signals indicative of a longitude and a latitude for providing commanded map and commanded station signals indicative of a commanded map in said strip and a commanded station thereof displaying the position identified by the latitude and longitude signals;
control means connected to said transport apparatus, said computer means and to said sensor means for receiving said commanded map and station signals and said map and station detection signals and causing said transport apparatus to register said commanded station of said commanded map of said strip in said display area;
said transport apparatus including first and second motor means connected for alternatively driving the strip, said transport apparatus being responsive to a first control signal for causing said second motor means to drive the strip at a predetermined rate;
said control means including map logic means connected to said transport apparatus and connected to said sensor means and said computer means for receiving said commanded map and map detection signal and being responsive to identity between said commanded map signal and said map detection signal received for providing said first control signal to said transport apparatus;
said computer means and said sensor means providing said commanded station signal and said station detection signal in parallel digital form having plural bits indicative of a number corresponding to the number of a corresponding one of said station areas enumerated from a leading end of the said map which has said enumerated station areas; and said control means further including:
station logic means connected to said sensor means and said computer means and being responsive to identity between said commanded station signal and said station detection signal received therefrom for providing a station response signal, said station means further including means providing the complements of each of the more significant bits of information in said commanded station signal and an AND gate connected for receiving said complements of said bits, a least significant bit of said commanded station signal and a more significant bit of said station detection signal for providing a station reversal response signal;
means providing the complement of said first control signal; and
direction control means normally responsive to said complement of said first control signal for providing a forward direction signal to said second motor means and responsive to said station reversal response signal occurring after said first control signal for providing a reverse direction signal to said second motor means until the subsequent occurrence of said station response signal.

9. Display apparatus according to claim 8 wherein said direction control means comprises:
flip-flop means;
setting means connected to said flip-flop means and responsive to said complement of said first control signal for setting said flip-flop means;
resetting means connected to said flip-flop means and responsive to said station reversal response signal occurring during said first control signal for resetting said flip-flop means; and
gating means connected to said flip-flop means for providing until the occurrence of said station response signal said forward direction signal when said flip-flop means is set and said reverse direction signal when said flip-flop means is reset.

10. Apparatus according to claim 9 wherein:
said control means further includes pulse providing means providing a pulse train having a frequency greater by at least two orders of magnitude than that frequency having a period equal to a predetermined duration of said map detection signals;
said setting means includes first AND gate means connected to receive both said pulse train and said complement of said first control signal for setting said flip-flop means; and
said resting means includes second AND gate means connected to receive said pulse train, said first control signal and said station reversal response signal for resetting said flip-flop means.

11. Display apparatus according to claim 8 wherein said station logic means comprises:
a plurality of exclusive OR gate means each connected to receive one of said bits of said station detection signal and the correspondingly significant bit of said commanded station signal;
OR gate means connected to receive the output signal of each of said exclusive OR gate means; and
inverter means connected to receive and invert the output signal of said OR gate means for providing said station response signal.

12. Display apparatus comprising:
an elongated map strip comprising a plurality of end-to-end linked maps displaying predetermined fields of view, each said map having a plurality of transversely extending station areas, said strip including coded map indicia and coded station indicia arranged for distinguishing each said map and each said station;
transport apparatus for transporting said strip along a a strip movement path extending through a display area;

sensor means arranged in sensing proximity to said path for sensing registration of said coded map and station indicia and providing corresponding map detection signals and corresponding station detection signals;

computer means responsive to input signals indicative of a longitude and a latitude for providing commanded map and commanded station signals indicative of a commanded map in said strip and a commanded station thereof displaying the position identified by the latitude and longitude signals;

control means connected to said transport apparatus, said computer means and to said sensor means for receiving said commanded map and station signals and said map and station detection signals and causing said transport apparatus to register said commanded station of said commanded map of said strip in said display area;

said transport apparatus including first and second motor means connected for alternatively driving the strip, said transport apparatus being responsive to a first control signal for causing said second motor means to drive the strip at a predetermined rate;

said control means including map logic means connected to said transport apparatus and connected to said sensor means and said computer means for receiving said commanded map and map detection signal and being responsive to identify between said commanded map signal and said map detection signal received for providing said first control signal to said transport apparatus; and said map logic means comprising:

register means connected to said sensor means and responsive to an update signal for storing said map detection signal and providing a corresponding register output signal;

signal identity comparing means connected to receive said commanded map signal and said register output signal for providing said first control signal in response to identity between said commanded map and said map detection signals;

means providing the complement of said first control signal; and update control means connected to receive said map detection signal and connected to receive said complement of said first control signal for providing an update signal to said register means only when said first control signal complement and said map detection signal are simultaneously present.

13. Display apparatus according to claim 12 wherein said update control means comprises:

first single-shot multivibrator means connected for triggering by said map detection signal and providing a first pulse of predetermined duration half as long as a predetermined duration of said map detection signal;

spike generator means connected to receive said first rectangular pulse and being responsive to the trailing transition of said pulse for producing a spike output signal; and a first AND gate connected to said register means and connected to receive said first control signal complement, said map detection signal and said spike output signal for providing said update signal to said register means.

14. Display apparatus according to claim 13 wherein said update control means further comprises:

second single-shot multivibrator means connected to receive said update signal from said first AND gate for providing an inhibit signal to said first multivibrator means of duration less than a predetermined interval between succeeding map detection signals and at least one order of magnitude greater than said predetermined duration of said map detection signal.

15. Display apparatus according to claim 12 wherein said control means further comprises:

means connected to said register means and said computer means and being responsive to an interruption in the provision of said commanded map signal by said computer means to said control means for applying a clearing signal to said register means.

16. Display apparatus comprising:

an elongated map strip comprising a plurality of end-to-end linked maps displaying predetermined fields of view, each said map having a plurality of transversely extending station areas, said strip including coded map indicia and coded station indicia arranged for distinguishing each said map and each said station;

transport apparatus for transporting said strip along a strip movement path extending through a display area;

sensor means arranged in sensing proximity to said path for sensing registration of said coded map and station indicia and providing corresponding map detection signals and corresponding station detection signals;

computer means responsive to input signals indicative of a longitude and latitude for providing commanded map and commanded station signals indicative of a commanded map in said strip and a commanded station thereof displaying the position identified by the latitude and longitude signals;

control means connected to said transport apparatus, said computer means and to said sensor means for receiving said commanded map and station signals and said map and station detection signals and causing said transport apparatus to register said commanded station of said commanded map of said strip in said display area;

said transport apparatus including first and second motor means connected for alternatively driving the strip, said transport apparatus being responsive to a first control signal for causing said second motor means to drive the strip at a predetermined rate;

said control means including map logic means connected to said transport apparatus and connected to said sensor means and said computer means for receiving said commanded map and map detection signal and being responsive to identity between said commanded map signal and said map detection signal received for providing said first control signal to said transport aparatus;

said computer means and said sensor means each providing said respective commanded map and said map detection signals in a parallel digital form having plural bits indicative of the respective numbers of the commanded and detected maps; and said map logic means comprising:

complementing means connected to said sensor means for receiving said map detection signal and providing as a plural bit output signal the complements of said bits of said portion detection signal;

adder means having plural stages each connected to receive a respective bit of said commanded map signal, each stage further being connected to receive the correspondingly significant bit of said complementing means output signal, said adder providing a sum output signal from each stage; and first AND gate means connected to receive said sum output signals from said stages of said adder for providing said first control signal.

17. Display apparatus according to claim 16 wherein:

said first motor means is responsive to first and second direction signals for driving said strip respectively in a forward direction and in a reverse direction;

said adder means provides a carry output signal from its most significant stage; and said map logic means further comprises:

means providing the complements of said first control signal and of said carry output signal;

second AND gate means connected to receive said carry output signal and said complement of said first control signal for providing said first direction signal to said first motor means; and third AND gate means connected to receive said complements of said first control signal and of said carry output signal for providing said second direction control signal to said first motor means.

18. Display apparatus comprising:

an elongated map strip comprising a plurality of end-to end linked maps displaying predetermined fields of view, each said map having a plurality of transversely extending station areas, said strip including coded may indicia and coded station indicia arranged for distinguishing each said map and each said station;

transport apparatus for transporting said strip along a strip movement path extending through a display area;

sensors means arranged in sensing proximity to said path for sensing registration of said coded map and station indicia and providing corresponding may detection signals and corresponding station detection signals;

computer means responsive to input signals indicative of a longitude and a latitude for providing commanded map and commanded station signals indicative of a commanded map in said strip and a commanded station thereof displaying the position identified by the latitude and longitude signals;

control means connected to said transport apparatus, said computer means and to said sensor means for receiving said commanded map and station signals and said map and station detection signals and causing said transport apparatus to register said commanded station of said commonded map of said strip in said display area;

said transport apparatus including first and second motor means connected for alternatively driving the strip, said transport apparatus being responsive to a first control signal for causing said second motor means to drive the strip at a predetermined rate;

said control means including map logic means connected to said transport apparatus and connected to said sensor means and said computer means for receiving said commanded map and map detection signal and being responsive to identity between said commanded map signal and said may detection signal received for providing said first control signal to said transport apparatus;

said second motor means including stepper motor means responsive to pulses applied thereto for driving step strip;

said map strip including for each said station area a plurality of transversely extending substation areas and substation indicia for distinguishing said substation area;

said computer means further providing a commanded substation signal indicative of a commanded substation of said commanded station displaying the position identified by the latitude and longitude signals;

said apparatus including substation sensing and logic means connected to said computer means for providing a substation response signal in response to sensing the substation indicated by said commanded substation signal;

said computer means further including means providing a first rate of change signal indicative of the rate of change of one of said input latitude and longitude signals; and said control means including mode control means connected to said map logic means, said substation sensing and logic means and said computer means for receiving said first control signal, said substation response signal and said first rate of change signal and connected to said stepper motor means, said mode control means including first pulse providing means for providing a first pulse train having a frequency for causing said stepper motor means to drive said strip at said predetermined station search rate and including second pulse providing means responsive to said first rate of change signal for providing a second pulse train having a frequency for causing said stepper motor means to drive said strip at a scaled rate, said mode control means being responsive to said first control signal for providing said first pulse train to said stepper motor means and being thereafter responsive to said substation response signal for providing said second pulse train to said stepper motor means.

19. Display apparatus according to claim 18 further comprising:

an indicator moveable in registration with said display area and transversely of said path of strip movement; and means connected to said computer means for receiving the other of said latitude and longitude signals and being responsive thereto for registering said indicator with the position identified by the input signals to said computer means indicative of latitude and longitude and displayed in said commanded substation.

20. Display apparatus according to claim 18 wherein:

said substation areas of said strip are contiguous and have predetermined widths; and said substation sensing and logic means comprises:

a plurality of substation indicia sensor means arranged in sensing proximately to said path in an array extending parallel to the direction of said path and spaced apart distances equal to said predetermined widths of said substation area, each said substation indicia sensor means being responsive to a respective actuating signal for providing a substation detection signal upon registry therewith of said substation indicia;

substation response gating means connected to said substation indicia sensor means for receiving said substation detection signals and providing said substation response signal to said mode control means; and substation sensor actuating means connected to said substation sensor means and to said computer means for receiving said commanded substation signal and providing said actuating signal to the corresponding one of said substation sensor means.

21. Display apparatus according to claim 18 wherein:

said map logic means includes means providing the complement of said first control signal; and said mode control means further comprises:

first flip-flop means for providing first set and first reset output signals;

first setting means responsive to said complement of said first control signal for setting said first flip-flop means;

first resetting means responsive to the concurrence of said substation response signal with said first control signal for resetting said first flip-flop means; and speed control gating means connected to receive said first and second pulse trains from said first and second pulse providing means and being responsive to said first set output signal for providinig said first pulse train to said stepper motor means and being responsive to said first reset output signal for providing said second pulse train to said stepper motor means.

22. Display apparatus according to claim 21 wherein said speed control gating means of said mode control means comprises:
  first AND gate means connected to receive said first pulse train and said first set output signal;
  second AND gate means connected to receive said second pulse train and said first reset output signal;
  a first OR gate connected to receive the output signals of said first and second AND gate means;
  third AND gate means connected to receive as one input the output signal of said first OR gate for providing a speed output signal to said stepper motor means; and
  inverting means connected to receive said complement of said first control signal for inverting said signal and providing an input signal to said third AND gate means.

23. Display apparatus according to claim 22 wherein:
  said transport apparatus includes strip braking means responsive to a braking signal for applying during the presence thereof a braking force to the strip;
  said control means further includes single-shot multi-vibrator means connected for receiving said first control signal and being responsive to an occurrence thereof for providing a rectangular output pulse of predetermined duration and fourth AND gate means connected for receiving said rectangular pulse from said multivibrator means and said first control signal for providing said braking signal to said braking means; and
  said inverting means of said speed control gating means includes a second OR gate connected to receive said braking signal and said complement of said first control signal and includes an inverter connected to receive the output signal of said second OR gate for providing said input signal to said third AND gate means.

24. Display apparatus according to claim 22 wherein said mode control means further comprises:
  third pulse providing means providing a third pulse train having a frequency greater by at least two orders of magnitude than that frequency having a period equal to a predetermined duration of said map detection signals; and
  said first setting means includes a fifth AND gate connected to receive said complement of said first control signal and said third pulse train for providing an output signal to set said first flip-flop means; and
  said first resetting means includes a sixth AND gate means connected to receive said first control signal, said third pulse train and said substation response signal for providing an output signal to reset said first flip-flop means.

25. Display apparatus according to claim 21 wherein:
  said stepper motor means is responsive to forward and reverse direction signals for driving said strip respectively in forward and reverse directions;
  said control means further comprises station logic means connected to said computer means and said sensor means for receiving said command station and station detection signals and responsive to identity therebetween for providing a station response signal; and
  said mode control means further comprises:
  mode sequence means connected to receive said station response and said substation response signals for providing a substation mode signal during an interval terminating with an occurrence of said substation response signal; and
  direction control means including first gating means connected to receive said substation mode signal and in response thereto for providing said forward direction signal to said stepper motor means.

26. Display apparatus according to claim 25 wherein:
  said computer means further provides a pair of complementary signals indicative of the direction of change of said one of said input latitude and longitude signals;
  said station logic means further comprises means providing a station reversal response signal in response to receiving a commanded station signal indicative of a first station area and receiving a station detection signal indicative of succeeding station area; and
  said mode control means further comprises:
  second flip-flop means providing a second reset output signal being said substation mode signal and a second set output signal;
  second setting means responsive to said first reset output for setting said second flip-flop means, said second setting means further being responsive to said complement of said first control signal for setting said second flip-flop means;
  second resetting means responsive to the concurrence of said station responsive signal with said first control signal for resetting said second flip-flop means;
  first AND gate means connected to receive said first and second set output signals for providing a station mode signal;
  second and third AND gate means both connected to receive said first reset output signal and each connected to receive a respective one of said complementary direction signals from said computer means;
  station mode direction means responsive to said station mode signal means for normally providing a station mode forward signal and for providing a station mode reverse signal in response to the concurrence of said station reverse response signal with said first control signal;
  said first gating means comprising first OR gate means connected to receive said substation mode signal, said station mode forward signal and the output signal of one of said second and third AND gate means for providing said forward direction signal to said stepper motor means; and
  second OR gate means connected to receive said station mode reverse signal and the output signal of the other of said second and third AND gate means for providing said reverse direction signal to said stepper motor means.

References Cited

UNITED STATES PATENTS

| | | | |
|---|---|---|---|
| 1,889,575 | 11/1932 | Sebille | 353—26 X |
| 2,323,372 | 7/1943 | Bryce | 353—26 |
| 2,608,094 | 8/1952 | Best | 353—12 X |
| 2,635,372 | 4/1953 | Field | 353—12 X |
| 2,761,351 | 9/1956 | Gehring et al. | 353—26 |
| 3,175,460 | 3/1965 | Honick | 353—12 |
| 3,208,336 | 9/1965 | Vago | 235—150.27 X |
| 3,284,923 | 11/1966 | Leslie | 35—9 X |
| 3,290,987 | 12/1966 | James et al. | 353—26 |
| 3,344,707 | 10/1967 | Davin | 353—11 |
| 3,359,408 | 12/1967 | Briggs | 235—150.27 |

FOREIGN PATENTS 911,972   12/1962   Great Britain.

MALCOLM A. MORRISON, Primary Examiner

F. D. GRUBER, Assistant Examiner

U.S. Cl. X.R.

35—10.2, 12; 235—150.23; 353—12, 26